United States Patent Office 3,384,102
Patented May 21, 1968

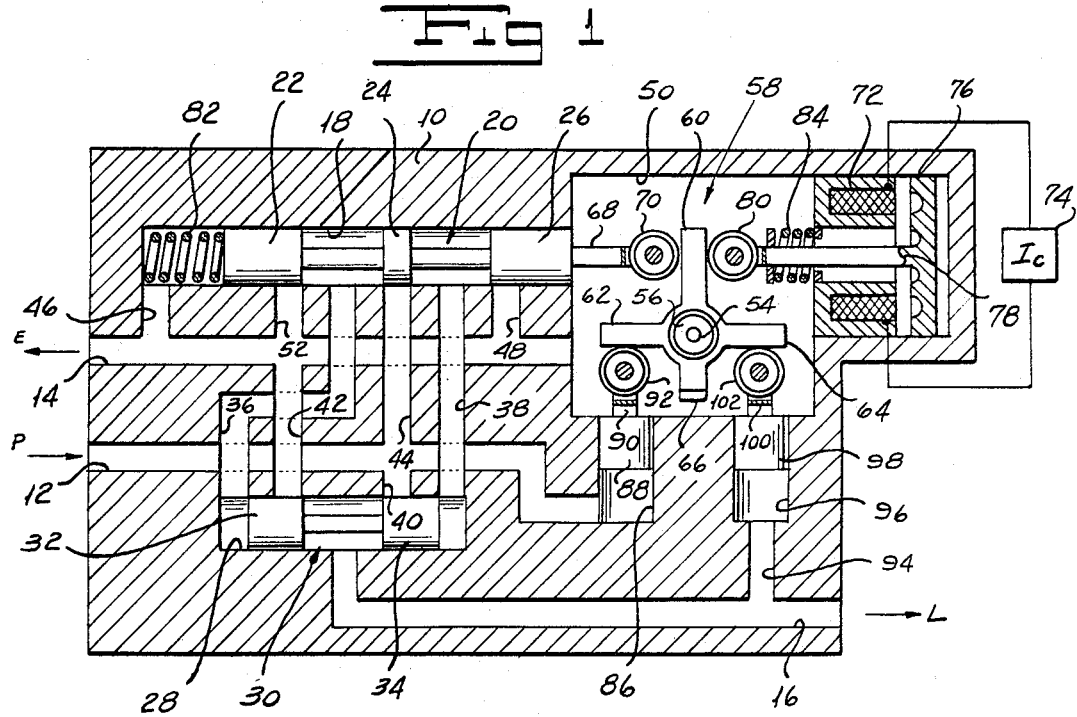
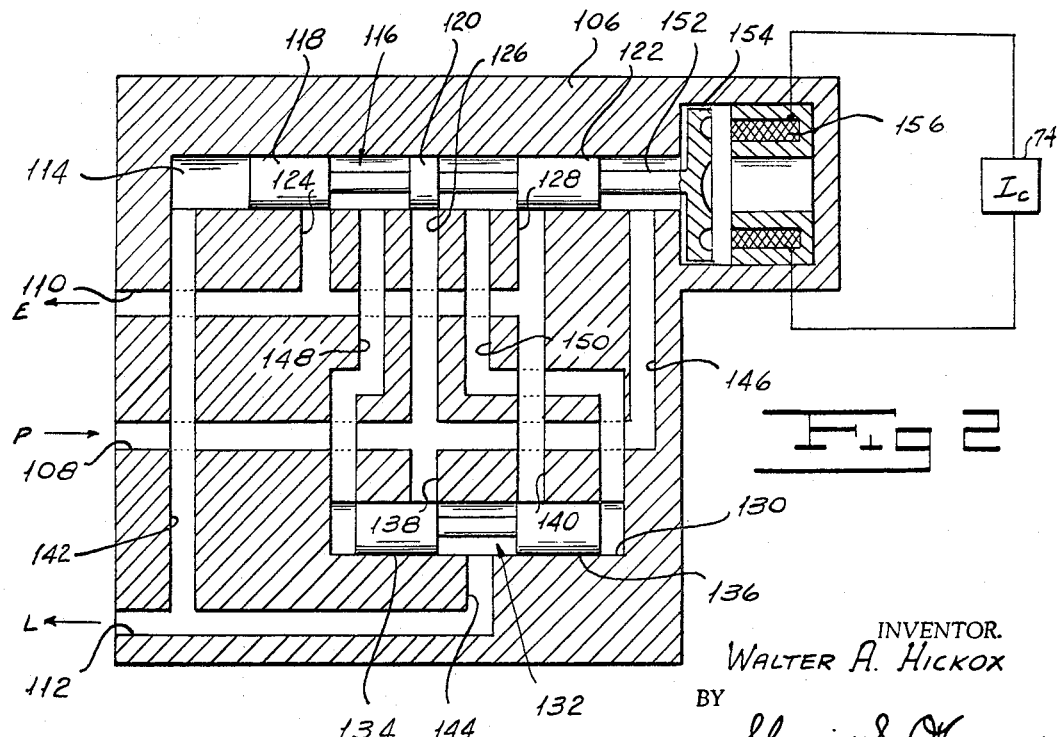

3,384,102
PRESSURE CONTROL VALVE
Walter A. Hickox, Glen Cove, N.Y., assignor to Ozone Metal Products Corp., Ozone Park, N.Y., a corporation of New York
Filed Apr. 29, 1964, Ser. No. 363,415
11 Claims. (Cl. 137—85)

My invention relates to a pressure control valve and more particularly to a valve for maintaining a constant difference between two variable pressures.

Various devices are known in the prior art for providing a regulated pressure from a nominally constant pressure source. For example, the source may act through a spring loaded device to produce the regulated pressure. Alternatively, a feedback system can be employed in which a sensor responsive to the output pressure acts on a device to which the source pressure is applied to provide the required regulation.

In many instances it is desired to maintain a constant pressure difference between two variable pressures. One example of such a system is an anti-skid braking system employed on aircraft and the like where the braking force applied to a skidding wheel is reduced. Such a constant pressure difference system might be devised by applying the two variable pressures to respective regulating devices, comparing the regulated outputs and feeding the results of the comparison back to one of the regulators to maintain the desired difference. While such an arrangement might function over a limited range, even then it is relatively complicated for the result achieved thereby. Moreover, in installations of the type described above, the variable pressures change over a relatively wide range so that regulating systems of the prior art would be required to operate over a much wider range than that over which they are intended to operate. Thus, no practical and satisfactory system is known in the prior art for maintaining a constant difference between two variable pressures.

I have invented a pressure control valve for maintaining a constant pressure difference between two variable pressures. My system is extremely simple for the result achieved thereby. It is adapted to operate over a wide range of pressures.

One object of my invention is to provide a pressure control valve for maintaining a constant pressure difference between two variable pressures.

Another object of my invention is to provide a pressure control valve which is simple in construction and operation for the result achieved thereby.

A further object of my invention is to provide a pressure control valve which can operate over a relatively wide range of pressures.

Other and further objects of my invention will appear from the following description.

In general my invention contemplates the provision of a pressure control valve system wherein two pressures, the difference between which is to be maintained constant, position a pilot valve in a neutral position when the pressures are equal.

In the accompanying drawings which form part of the instant specification and which are to be read in conjunction therewith and in which like reference numerals are used to indicate like parts in the various views:

FIGURE 1 is a schematic view of one form of my pressure control valve.

FIGURE 2 is a schematic view of a modified form of my pressure control valve.

Referring now to FIGURE 1 of the drawings, the form of my pressure control valve shown therein includes a housing 10 provided with a main passage 12 connected to any suitable variable source of fluid under pressure (not shown) as indicated by the letter P in the drawing. Housing 10 has a main exhaust passage 14 leading to the atmosphere as indicated by the letter E, as well as a passage 16 which conducts fluid to the load as indicated by the letter L such, for example, as a fluid operated brake. A pilot or control valve chamber 18 in the housing 10 slidably receives a first spool valve indicated generally by the reference character 20 comprising a left cylinder 22, a central cylinder 24 and a right cylinder 26.

A main supply valve chamber 28 slidably receives the main supply spool valve indicated generally by the reference character 30 comprising a left cylinder 32 and a right cylinder 34. Passage 16 leads into the chamber 28 between the two cylinders 32 and 34. A passage 36 connects the end of chamber 28 to the left of cylinder 32 to chamber 18 between cylinder 22 and cylinder 24. Similarly, a passage 38 connects the portion of chamber 28 to the right of cylinder 34 to the space between cylinders 24 and 26. A port or passage 40 connects the portion of chamber 28 adjacent cylinder 34 to the main supply passage 12 while a passage 42 connects the portion of chamber 28 adjacent cylinder 32 to the main exhaust passage 14. In the neutral position of the spool valve 30, cylinder 32 blocks the passage 42 while cylinder 34 blocks the passage 40. When, as will be described hereinbelow, spool 30 is displaced to the left, the passage 40 remains blocked but passage 42 is opened to connect the load passage 16 to the exhaust line 14. If, on the other hand, spool 30 is displaced to the right, passage 42 is blocked but passage 40 is opened to connect the main supply line 12 to the load line 16.

A passage 44 connects the main supply line 12 to the central part of the chamber 18 adjacent which cylinder 24 normally is disposed. I connect the exhaust line 14 to chamber 18 at the left of the cylinder 22 by means of a passage 46. A port 48 connects the exhaust line 14 to chamber 18 in the region of cylinder 26. Exhaust line 14 leads into a relatively large chamber 50 into which chamber 18 opens.

In the neutral position of the pilot or control spool 20, cylinder 22 covers a port 52 leading to the exhaust line, cylinder 24 covers passage 44 and cylinder 26 covers port 48. If, as is described hereinbelow, the spool 20 is displaced to the right, port 52 remains covered but passage 44 is opened to connect the main supply line 12 to the space between cylinders 22 and 24 to supply the main fluid pressure to chamber 28 at the left of cylinder 32 through the passage 36. At the same time, port 48 leading to the exhaust line 14 is opened to permit fluid to flow from chamber 28 to the right of cylinder 34 through passage 38, through the space between cylinders 24 and 26 and through port 48 to the exhaust line 14.

The chamber 50 houses the actuating mechanism of my pressure control valve. A shaft 54 within the chamber 50 carries a bearing 56 which rotatably supports a T shaped member, indicated generally by the reference character 58, having a generally vertically disposed arm 60 and a pair of oppositely extending generally horizontally disposed arms 62 and 64. If desired, member 58 may be provided with a counterweight 66. A rod 68 on the spool valve 20 carries a rotatable follower 70 adapted to engage one side of the arm 60. My apparatus comprises a current responsive actuating device including a coil 72 adapted to be supplied with current from a source 74 in the event it is desired to reduce the load pressure. Coil 72, when energized, attracts an armature 76 to move the armature to the left as viewed in FIGURE 1. Armature 76 comprises a rod 78 carrying a rotatable follower 80 adapted to engage the other side of arm 60 from follower 70.

A spring 82 acting between the left end of chamber 18 and the spool valve 20 normally urges the spool valve to the right to its neutral position to return the valve following a control operation to be described hereinbelow. I provide my apparatus with a second spring 84 which normally tends to move rod 78 to the left as viewed in FIGURE 1 to balance the effect of spring 82.

I provide my pressure control valve with means for applying both the load pressure and the supply pressure to the arms 62 and 64 of the sensing member 58. The main pressure line 12 leads into a cylindrical chamber 86 housing a piston 88. Piston 88 has a rod 90 carrying a rotatable follower 92 adapted to engage the underside of the arm 62. A passage 94 leads from the load line 16 to a cylindrical chamber 96 housing a piston 98 having a rod 100 carrying a rotatable follower 102 for engaging the underside of the arm 64.

From the structure just described, it will readily be apparent that with no current supplied to the coil 72 and with the load pressure equal to the supply pressure, followers 92 and 102 act on arms 62 and 64 to urge member 58 to a neutral position. It is to be understood, of course, that the areas of pistons 88 and 98 are equal.

From the foregoing description it will be apparent that where there is no current in the coil 72 and the supply pressure is equal to the load pressure, the parts will occupy the positions shown in FIGURE 1. Now, let us assume that coil 72 receives a signal indicating a desired pressure difference between supply and load pressures. For example, where a vehicle such as an aircraft or the like is being braked to a stop and one of the wheels begins to skid, it will be apparent that the braking force being applied to the wheel should be reduced. Any suitable means responsive to slippage of the wheels may be employed to generate a control signal in that event. This signal is in the form of a current supplied to coil 72. When the coil is energized it moves armature 76 to the left as viewed in FIGURE 1 to displace the sensing member 58 in a counterclockwise direction as viewed in the figure. It will readily be apparent that this displacement of the member 58 shifts spool valve 20 to the left against the action of spring 82. When this occurs, cylinder 24 opens passage 44 to cause the main supply pressure to be applied to the cylinder 34 through passage 44, chamber 18 and passage 38. Owing to this fact, spool 30 shifts to the left and the load line 16 is connected through passage 42 to exhaust line 14. Thus, the pressure on the supply line 16 is reduced. Ultimately, owing to the reduced braking force, the signal supplied to coil 72 disappears and the system returns to normal. If it should occur that the load pressure drops below the desired load pressure, then spool 20 shifts to the right until the pressure builds up to the desired value.

Referring now to FIGURE 2, I have shown a simplified form of my pressurec ontrol valve wherein the need for the pistons 88 and 98 is done away with. This form of my valve includes a housing 106 having a supply line 108, an exhaust line 110 and a load line 112. A pilot valve chamber 114 slidably receives the pilot valve spool 116 comprising a left cylinder 118, a central cylinder 120 and a right cylinder 122. In the neutral position of the spool 116, cylinder 118 blocks a passage 124 leading to the exhaust line 110, cylinder 120 blocks a passage 126 leading to the supply line 108 and cylinder 122 blocks a passage 128 leading to the exhaust line 110.

A chamber 130 slidably receives the main valve spool 132 comprising a left cylinder 134 and a right cylinder 136. In the neutral position of this spool 132, cylinder 134 blocks a passage 138 leading to supply line 108 while cylinder 132 blocks a passage 140 leading to the exhaust line 110. A first passage 142 connects the load line 112 to chamber 114 at the left of cylinder 118. Passage 144 connects the load line to chamber 130 between the cylinders 134 and 136. I provide a passage 146 for connecting the supply line 108 to chamber 114 at the right of cylinder 122. Respective passages 148 and 150 connect the portion of chamber 114 between cylinders 118 and 120 to chamber 130 at the left of cylinder 134 and connect the portion of chamber 114 between cylinders 120 and 122 to chamber 130 at the right of cylinder 136.

Spool 116 carries a rod 152 connected to an armature 154 adapted to be moved to the right as viewed in the figure in response to energization of a winding 156.

From the structure just described in connection with the showing of FIGURE 2, it will be apparent that the load pressure is applied to the left of spool 116 through passage 142 while the supply pressure is applied to the right of the spool by passage 146. Thus, in the absence of a signal on winding 156, if the supply pressure is equal to the load pressure, spool 116 occupies a neutral position at which its cylinders 118, 120 and 122 respectively block passages 124, 126 and 128. In its neutral position, spool 132 blocks passages 138 and 140.

Assuming that a signal is applied to winding 156, armature 154 is displaced slightly to the right as viewed in FIGURE 2 to move spool 116 to the right. This operation connects passage 126 to passage 148 to apply the main supply pressure to the left of cylinder 134. Thus, spool 132 shifts to the right to open passage 140 to connect the load line 112 to the exhaust line 110, through chamber 130 and passage 140. Thus, the load pressure is reduced.

In operation of the form of my invention shown in FIGURE 1, as has been explained hereinabove, with no signal being applied to the winding 72 and with supply pressure P equal to load pressure L, beam 58 occupies its neutral position and the valve 20 also is in its neutral position. Assuming that the device 74 provides a signal indicating that the load pressure is too great, the signal energizes winding 72 to move armature 76 to the left. This displaces beam 58 in a counterclockwise direction to shift valve 20 to the left to connect the pressure line 12 to the portion of chamber 28 to the right of cylinder 34 through passages 44 and 38. Owing to this connection, valve 30 shifts to the left to connect the load line 16 to the exhaust line 14 through passage 42. Load pressure now is bled off through the exhaust passage.

It will be appreciated that the force of supply pressure P on the piston 88 is opposed by the sum of the force applied by roller 80 to the arm 60 and by the load pressure L acting on piston 98. After the load pressure has been reduced by an amount proportional to the signal applied to winding 72, the force of the supply pressure on piston 88 overcomes the force exerted by roller 80 and the force of the reduced load pressure acting on piston 98 until the beam 58 is returned to its neutral position. Since load pressure is still connected to the exhaust line 14, it will tend to drop very slightly and the beam 58 will move slightly in a clockwise direction. The valve 20 then moves to the right a short distance beyond its neutral position and the slight drop in load pressure will be made up until both the valve 20 and the valve 30 occupy their neutral positions. Now, as long as the signal is still applied to the winding 72, the load pressure L differs from the supply pressure P by an amount proportional to the signal. It will be appreciated that if the beam 58 is driven in a counterclockwise direction it must act against the force exerted thereon by spring 82 through the roller 70. Owing to the fact that the spring is merely a centering device and for purposes of simplicity, the force exerted by spring 82 has not been considered in the analysis given.

Assuming now that the signal supplied by the device 74 disappears, then the force of supply pressure P acting on the piston 88 overcomes the force of the load pressure acting on piston 98 and beam 58 is displaced in a clockwise direction. Thus, valve 20 moves to the right to connect supply pressure to the area of chamber 28 to the left of cylinder 32 through passage 36 and valve 30 is displaced to the right. Now supply pressure flows through port 40 to load line 16 to build up the load pressure until the force of the load pressure acting on piston 98 balances the force of the supply pressure acting on piston 88. All the parts of the system then return to the neutral position wherein supply pressure is equal to load pressure in the absence of a signal supplied to winding 72.

In operation of the form of my valve shown in FIGURE 2, with no signal applied to the winding 156 and with supply pressure P equal to load pressure L, both valve 116 and valve 132 are in their neutral positions. If a signal from the device 74 indicates that the load pressure is too great, the winding is energized to move armature 154 to the right to displace valve 116 to the right. This connects the supply pressure line 108 to the space in chamber 130 to the left of cylinder 134 through passages 126 and 148. Valve 132 moves to the right to connect the load line 112 to the exhaust line 110 through passage 140. The load pressure begins to drop and continues to do so until the force of the load pressure on cylinder 118 plus the force exerted by winding 156 tending to move valve 116 to the right is equal to the force of the supply pressure P acting on cylinder 122 and armature 154 tending to move valve 116 to the left. Under these conditions, both valve 116 and valve 132 return to their neutral positions, it being understood that valve 116 may move slightly past neutral position before the valve 132 returns to its neutral position.

When the signal on winding 156 disappears, supply pressure acting on cylinder 122 and on armature 154 shifts valve 116 to the left to apply supply pressure to the right end of cylinder 136 through passages 126 and 150. Thus, valve 132 moves to the left to connect supply pressure line 108 to the load line 112 through passages 138 and 144. When the supply and load pressures are equal, valves 116 and 132 return to their neutral positions.

It will readily be understood that in both forms of my invention, if the supply pressure P increases in the absence of any signal on winding 72 or winding 156, the load pressure also will increase until supply and load pressures are equal.

It will be seen that I have accomplished the objects of my invention. I have provided a pressure control valve for maintaining a constant pressure difference between two variable pressures. My valve is simple in its construction and in its operation for the result achieved thereby. My valve is adapted to operate over a relatively wide range of pressures.

It will be understood that certain features and subcombinations are of utility and may be employed without reference to other features and subcombinations. This is contemplated by and is within the scope of my claims. It is further obvious that various changes may be made in detail within the scope of my claims without departing from the spirit of my invention. It is, therefore, to be understood that my invention is not to be limited to the specific details shown and described.

Having thus described my invention, what I claim is:

1. A valve system for governing the pressure difference between a variable supply pressure and a variable load pressure including in combination a main valve having an inlet port and an outlet port and a positionable element for controlling the coupling between said inlet and outlet ports, said valve having a respective control port at each end of said positionable element, a source of variable supply pressure, means connecting said source to said inlet port to provide said load pressure at said outlet port, an auxiliary valve comprising an inlet channel to which supply pressure is applied, an exhaust channel connected to a pressure less than said variable load pressure, ports respectively connected to said main valve control ports and a positionable member movable to a first position to connect one of said auxiliary valve ports to said inlet channel while connecting the other of said auxiliary valve ports to said exhaust channel and movable to a second position to connect said other auxiliary valve port to said inlet channel while connecting the one auxiliary port to said exhaust channel, means responsive to said supply pressure for urging said auxiliary valve member toward said first position to position said main valve element to change the coupling in one sense, means responsive to said load pressure for urging said auxiliary valve member toward said second position to position said main valve element to change the coupling in the opposite sense, a control force producing means and means responsive to said control force for actuating said auxiliary valve member in concert with one of either said supply or said load pressures.

2. A system for governing the pressure difference between two variable pressures including in combination, a source of a first variable pressure, a main valve having an inlet port and an exhaust port and an outlet port and an element adapted to be positioned to control the coupling between said outlet port and said inlet and exhaust ports, said valve having a respective control port at each end of said positionable element, means for applying said first pressure to said inlet port to produce a second variable pressure at said outlet port, means connecting said exhaust port to a pressure less than said second variable pressure, said element being displaceable in one direction to connect said inlet port to said outlet port and being displaceable in the other direction to connect said exhaust port to said outlet port, an auxiliary valve comprising an inlet channel to which said first pressure is applied, an exhaust channel connected to a pressure less than said second pressure, ports respectively connected to said main valve control ports and a positionable member movable to a first position to connect one of said auxiliary valve ports to said inlet channel while connecting the other of said auxiliary valve ports to said exhaust channel and movable to a second position to connect said other auxiliary valve port to said inlet channel while connecting said one auxiliary port to said exhaust channel, means for applying said first pressure to said member to urge it towards said first position, means for applying said second pressure to said member to urge it toward said second position, means comprising a magnetic armature connected to said member and a winding adapted to be energized to produce a magnetic field for acting on said armature to urge said member to move in one of said directions.

3. A system for governing the pressure difference between two variable pressures including in combination, a source of a first variable pressure, a main valve having an inlet port and an exhaust port and an outlet port and an element adapted to be positioned to control the coupling between said outlet port and said inlet and exhaust ports, said valve having a respective control port at each end of said positionable element, means for applying said first pressure to said inlet port to produce a second variable pressure at said outlet port, means connecting said exhaust port to a pressure less than said second variable pressure, said element being displaceable in one direction to connect said inlet port to said outlet port and being displaceable in the other direction to connect said exhaust port to said outlet port, an auxiliary valve comprising an inlet channel to which said first pressure is applied, an exhaust channel connected to a pressure less than said second pressure, ports respectively connected to said main valve control ports and a positionable member movable to a first position to connect one of said auxiliary valve ports to said inlet channel while connecting the other of said auxiliary valve ports to said exhaust channel and movable to a second position to connect said other auxiliary valve port to said inlet channel while connecting said one auxiliary port to said exhaust channel, means for applying said first pressure to said member to urge it towards said first position, means for applying said second pressure to said member to urge it towards said second position, and control force producing means for acting with one of said first or said second pressures.

4. A system for governing the pressure difference between two variable pressures including in combination a source of a first variable pressure, a valve having an inlet port and an outlet port and a movable element for controlling the coupling between the inlet and outlet ports, said valve having a control port at each end of said element, means applying the pressure of said source to said inlet port to provide a second variable pressure at said outlet port, a force balancing beam, means mounting said beam for movement around an axis, a first piston and cylinder assembly responsive to one of said pressures for urging said beam to rotate in one direction around said axis, a second piston and cylinder assembly responsive to the other pressure for urging said beam to rotate in the other direction around said axis, means providing a control force, means responsive to said control force for urging said beam to rotate around said axis in one of said directions, an exhaust channel connected to a pressure less than said second variable pressure, and means responsive to movement of said beam in said one direction for connecting one of said control ports to said source and connecting the other control port to said exhaust channel and responsive to movement of said beam in the other direction for connecting said other control port to said source while connecting the one control port to said exhaust channel.

5. A system for governing the pressure difference between two variable pressures including in combination a source of a first variable pressure, a valve having an inlet port and an outlet port and a movable element for controlling the coupling between the inlet and outlet ports, said valve having a control port at each end of said element, means applying the pressure of said source to said inlet port, said outlet port providing a second variable pressure, a force balancing beam, means mounting said beam for movement around an axis, means responsive to one of said pressures for urging said beam to rotate in one direction around said axis, means responsive to the other pressure for urging the beam to rotate in the other direction around said axis, means providing a control force, means responsive to said control force for urging said beam to rotate around said axis in one of said directions, an exhaust channel connected to a pressure less than said second variable pressure, and means responsive to movement of said beam in said one direction for connecting one of said control ports to said source and connecting the other control port to said exhaust channel and responsive to movement of said beam in the other direction for connecting said other control port to said source while connecting the one control port to said exhaust channel.

6. A valve system for governing the pressure difference between two variable pressures including in combination a first valve having an inlet port and an outlet port and a movable element for controlling the coupling between said inlet and outlet ports, said valve having a respective control port at each end of said positionable element, means applying the pressure of said source to said inlet port, said outlet port providing a second variable pressure, a second valve having an inlet channel to which said first pressure is applied, an exhaust channel connected to a pressure less than said second variable pressure, ports respectively connected to said control ports and a positionable member movable to a first position to connect one of said second valve ports to said inlet channel while connecting the other of said second valve ports to said exhaust channel and movable to a second position to connect said other second valve port to said inlet channel while connecting the one second valve port to said exhaust channel, means providing a control force and means responsive to said control force and to said first and second pressures for actuating said positionable member.

7. A system for governing the pressure difference between two variable pressures including in combination a source of a first variable pressure, a valve having an inlet port and an exhaust port and an outlet port and a movable element for controlling the coupling between said outlet port and said inlet and exhaust ports, said valve having a control port at each end of said element, means connecting said exhaust port to a pressure less than each of said variable pressures, said outlet port providing a second variable pressure, means applying the pressure of the source to the inlet port, an auxiliary valve comprising an inlet channel to which supply pressure is applied, an exhaust channel connected to a pressure less than said variable load pressure, ports respectively connected to said control ports and a positionable member movable to a first position to connect one of said auxiliary valve ports to said inlet channel while connecting the other of said auxiliary valve ports to said exhaust channel and movable to a second position to connect said other auxiliary valve port to said inlet channel while connecting said one auxiliary valve port to said exhaust channel, means responsive to said first pressure for urging said positionable member toward said first position to actuate said movable element to increase said coupling, means responsive to said second pressure for urging said positionable member to said second position to actuate said movable element to reduce said coupling, means providing a control force and means responsive to said force producing means for actuating said positionable member to provide an increment of the control of said coupling.

8. A system for governing the pressure difference between two variable pressures including in combination a source of a first variable pressure, a valve having an inlet port and an exhaust port and an outlet port and a movable element for controlling the coupling between the outlet port and said inlet and exhaust ports, said valve having a control port at each end of said element, means connecting said exhaust port to a pressure less than each of said variable pressures, said outlet port providing a second variable pressure, means applying the pressure of said source to said inlet port, an auxiliary valve comprising an inlet channel to which supply pressure is applied, an exhaust channel connected to a pressure less than said variable load pressure, ports respectively connected to said control ports and a positionable member movable to a first position to connect one of said auxiliary valve ports to said inlet channel while connecting the other of said auxiliary valve ports to said exhaust channel and movable to a second position to connect said other auxiliary valve port to said inlet channel while connecting said one auxiliary valve port to said exhaust channel, means responsive to said first pressure for moving said positionable member toward said first position to actuate said movable element to vary said coupling in one sense, means responsive to said second pressure for urging said positionable member toward said second position to actuate said movable element to vary said coupling in the opposite sense, means providing a control force and means responsive to said control force for actuating said positionable member to augment the variation of said coupling in one of said senses.

9. A system for governing the pressure difference between two variable pressures in response to a signal including in combination a source of a first variable pressure, a valve having an inlet port and an exhaust port and an outlet port and a movable element for controlling the coupling between the outlet port and said inlet and exhaust ports, said valve having a control port at each end of said element, means connecting said exhaust port to a pressure less than each of said variable pressures, means connecting said source to said inlet port to provide a second variable pressure at said outlet port, an auxiliary valve comprising an inlet channel to which supply pressure is applied, an exhaust channel connected to a pressure less than said variable load pressure, ports respectivley connected to said control ports and a positionable member movable to a first position to connect one of said auxiliary valve ports to said inlet channel while connecting the other of said auxiliary valve ports to said exhaust channel and movable to a second position to connect said other auxiliary valve port to said inlet channel while connecting said one auxiliary valve port to said exhaust channel, means responsive to said first pressure for urging said positionable member toward said first position to actuate said movable element to increase said coupling, means responsive to said second pressure for urging said positionable member to said second position to actuate said movable element to reduce said coupling, a source of a control signal, means responsive to said signal for providing a control force as a function of said signal and means responsive to said control force and to said first and second pressures for positioning said positionable member.

10. A system for governing the pressure difference between two variable pressures including in combination a source of a first variable pressure, a valve having an inlet port and an outlet port and a movable element for controlling the coupling between said inlet and outlet ports, said valve having a respective control port at each end of said movable element, means connecting said source to said inlet port to provide a second variable pressure at said outlet port, a balancing beam mounted for movement in response to forces applied thereto, an auxiliary valve comprising an inlet channel to which supply pressure is applied, an exhaust channel connected to a pressure less than said variable load pressure, ports respectively connected to said control ports and a positionable member movable to a first position to connect one of said auxiliary valve ports to said inlet channel while connecting the other of said auxiliary valve ports to said exhaust channel and movable to a second position to connect said other auxiilary valve port to said inlet channel while connecting said one auxiliary valve port to said exhaust channel, means responsive to movement of said beam for positioning said movable element, means providing a control force and means for applying said control force and said first and second pressures to said beam to position said positionable member.

11. A system for governing the pressure difference between two variable pressures in response to a signal including in combination a source of a first variable pressure, a valve having an inlet port and an outlet port and a movable element for controlling the coupling between said inlet and outlet ports, said valve having a respective control port at each end of said movable element, means connecting said source to said inlet port to provide a second variable pressure at said outlet port, an auxiliary valve comprising an inlet channel to which supply pressure is applied, an exhaust channel connected to a pressure less than said second variable pressure, ports respectively connected to said control ports and a positionable member movable to a first position to connect one of said auxiliary valve ports to said inlet channel while connecting the other of said auxiliary valve ports to said exhaust channel and movable to a second position to connect said other auxiliary valve port to said inlet channel while connecting said one auxiliary valve port to said exhaust channel, a source of a control signal, electromagnetic means responsive to said signal for providing a control force as a function of said signal and means responsive to said control force and to said first and second pressures for positioning said positionable member.

References Cited
UNITED STATES PATENTS

| | | | |
|---|---|---|---|
| 2,521,615 | 9/1950 | Walker. | |
| 2,940,461 | 6/1960 | Binford | 137—100 |
| 3,221,609 | 12/1965 | Frantz | 251—30 XR |

WILLIAM F. O'DEA, *Primary Examiner.*

D. J. ZOBKIW, *Assistant Examiner.*